(12) United States Patent
Habassi

(10) Patent No.: US 8,562,781 B2
(45) Date of Patent: Oct. 22, 2013

(54) METHOD FOR TREATING AN OPTICAL LENS FOR THE EDGING THEREOF

(75) Inventor: Chefik Habassi, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 13/129,364

(22) PCT Filed: Nov. 10, 2009

(86) PCT No.: PCT/FR2009/052171
§ 371 (c)(1),
(2), (4) Date: May 13, 2011

(87) PCT Pub. No.: WO2010/055261
PCT Pub. Date: May 20, 2010

(65) Prior Publication Data
US 2011/0223418 A1    Sep. 15, 2011

(30) Foreign Application Priority Data

Nov. 13, 2008  (FR) ..................................... 08 57719

(51) Int. Cl.
| | | |
|---|---|---|
| B29C 65/50 | (2006.01) | |
| B32B 37/14 | (2006.01) | |
| B32B 38/10 | (2006.01) | |
| B24B 1/00 | (2006.01) | |
| B24B 7/24 | (2006.01) | |

(52) U.S. Cl.
USPC ........... 156/247; 156/256; 156/267; 156/323; 451/42; 451/43; 451/54

(58) Field of Classification Search
USPC ........ 156/247, 256, 267, 323; 451/29, 41–43, 451/54, 240, 384
See application file for complete search history.

(56) References Cited

U.S. PATENT DOCUMENTS

2005/0042977 A1   2/2005   Kawase et al. .................. 451/41

FOREIGN PATENT DOCUMENTS

| JP | 2004-122238 | 4/2004 |
|---|---|---|
| JP | 2004-347660 | 9/2004 |
| WO | WO 02/092524 | 11/2002 |
| WO | WO 03/057641 | 7/2003 |
| WO | WO 03/092957 | 11/2003 |
| WO | WO 2004/110946 | 12/2004 |
| WO | WO 2005/015270 | 2/2005 |
| WO | WO 2006/105999 | 10/2006 |

OTHER PUBLICATIONS

PCT International Search Report issued in International application No. PCT/FR2009/052171 dated Aug. 24, 2010. (English translation).

*Primary Examiner* — Sing P Chan
(74) *Attorney, Agent, or Firm* — Fulbright & Jaworski LLP

(57) ABSTRACT

The present invention relates to a method for treating an optical lens coated on at least one of the main surfaces thereof with a hydrophobic and/or oleophobic external coating, to make it capable of undergoing an edging process, comprising a step of depositing onto at least one part of the hydrophobic and/or oleophobic external coating a temporary adhesive composite film, said adhesive composite film comprising a pre-formed film, one main surface of which is coated with a pressure-sensitive adhesive layer, said adhesive layer directly contacting the hydrophobic and/or oleophobic coating, the pre-formed film modulus of elasticity in tension E' being higher than or equal to 4200 MPa, and the rupture stress of the assembly composed of said adhesive film bonded to a polycarbonate specimen coated with a fluorinated silane layer, measured under tensile stress in accordance with the shear strength evaluation standard NF EN 1465, being higher than or equal to 0.05 MPa.

The present invention further relates to an edging method and to a lens capable of undergoing a successful edging process.

17 Claims, No Drawings

METHOD FOR TREATING AN OPTICAL LENS FOR THE EDGING THEREOF

This application is a national phase application under 35 U.S.C. §371 of International Application No. PCT/FR2009/052171 filed 10 Nov. 2009, which claims priority to French Application No. 0857719 filed 13 Nov. 2008. The entire text of each of the above-referenced disclosures is specifically incorporated herein by reference without disclaimer.

The present invention generally speaking relates to the use of an adhesive tape to facilitate the edging of optical glasses, especially of lenses, and very especially of ophthalmic lenses, provided with an external coating with hydrophobic and/or oleophobic properties (antifouling top coat), to an edging method and to such a lens having been made capable of undergoing an edging process by fixing an adhesive tape onto the surface thereof.

An optical lens, especially an ophthalmic lens, is the result of a series of successive molding and/or surface processing and/or polishing operations which determine the geometry of both convex and concave optical surfaces of the lens, and thereafter of suitable surface treatments.

The last finish step for making an ophthalmic lens is the step of edging or trimming, which consists in machining the edge or the periphery of the lens to conform the same to the required dimensions for adapting to the eyeglass frame within which it is intended to be mounted.

The edging is typically effected on a grinder comprising diamond wheels which perform the machining such as defined hereabove. The lens is clamped, during this operation, through axially acting blocking elements. The relative movement of the glass relative to the wheel is controlled, typically through a numerical control, so as to give the lens the required shape. As it appears, the lens must firmly be maintained during such process.

To do this, prior to edging, a blocking of the lens has to be performed that is to say a holding element or chuck is positioned on the convex surface of the lens. Typically, a holding pad (or a fixing pad) such as a self adhesive sticker, for example a double-sided adhesive pad, is arranged between the chuck and the convex surface of the lens. The chuck to which the lens adheres through the adhesive pad is then mechanically fixed along the mounting axis of the grinder and an axial arm is blocking the lens by applying a central force on the lens side opposite to the chuck. Upon machining, a tangential torque is exerted onto the lens, which may cause the lens to rotate relative to the chuck if the lens clamping device is not efficient enough. The reliable positioning of the lens mostly depends on the good adhesion at the interface between the holding pad and the convex surface of the lens.

Ophthalmic lenses of the last generation comprise most of the time an organic or a mineral external coating which changes the surface energy, for example an antifouling hydrophobic and/or oleophobic coating, well known in the art. They are for most of them materials of the fluorosilane type, which reduce the surface energy so as to prevent greasy soil deposits from adhering, which can then be removed more easily.

This type of surface coating may be efficient to such an extent that the adhesion at the pad/convex surface interface may be altered, which makes difficult to conduct satisfying edging operations, in particular for polycarbonate lenses (noted PC, for example bisphenol-A polycarbonate) which edging generates much higher stresses as compared to other materials.

Upon edging, the lens should not undergo any offset of more than 2°, preferably of maximum 1°, and therefore the pad adhesion to the lens surface is crucial for obtaining a good edging. As a result of the lens slipping during an unsuitable edging operation, the lens would be simply irreparably damaged and lost.

To overcome these difficulties in edging lenses that are provided with an external hydrophobic and/or oleophobic coating, it has been proposed to form on such coatings a temporary coating, of organic or mineral nature, in particular a $MgF_2$ coat. For example, the European patent applications EP 1 392 613 and EP 1 633 684, to ESSILOR, describe the use of such a temporary coating, which increases the surface energy and thus enables the optician to perform a reliable edging of the lens. After edging, the temporary coating should be removed so as to restore the lens external hydrophobic and/or oleophobic coating surface properties.

Depositing strippable protective films of polymeric nature onto anti-fouling coats has been described especially in the patent applications WO 2005/015270, WO 03/057641 and JP 2004-122238. They disclose curable compositions that are applied in a liquid form directly contacting the antifouling coating so as to form protective coating(s) thus avoiding the lens slipping out during the edging operation.

It has also been proposed to insert temporary adhesive films between the surface of a lens provided with antifouling properties and the clamping device so as to hold the same in place during the edging operation, especially in the patent applications WO 03/092957, JP 2004-141607 and US 2005/042,977.

The application WO 03/092957 describes the way a film with adhesive properties comprising a pressure-sensitive adhesive (or PSA) that is preferably acrylic in nature is deposited.

The application JP2003-141607 describes the deposition onto the surface of a lens provided with an anti-fouling coating of an adhesive tape obtained by depositing a pressure-sensitive adhesive onto a polymeric support film. The support film has a thickness ranging from 10 to 100 microns, a Young's modulus higher than 1 GPa and a transmittance of at least 80%. Typically, a tape comprising a support film with a Young's modulus of 4 GPa coated with a silicone-containing adhesive is bonded upon pressing the adhesive surface against the surface of the lens.

The application US 2005/042977 describes a similar assembly, comprising an adhesive tape obtained by depositing a 1-100 μm-thick pressure-sensitive adhesive layer onto an at least 10 μm-thick polymeric support film. The modulus of elasticity in tension of the support film (with no adhesive) does preferably vary from 9.8 $N/mm^2$ to 4410 $N/mm^2$ (i.e. from 9.8 MPa to 4410 MPa). Beyond this maximum value, it becomes hard to make the film conform to the lens shape.

This adhesive tape enables the edging of an ophthalmic lens provided with an antifouling external coat having a thickness ranging from 1 to 500 nm, and preferably from 1 to 30 nm when deposited onto an antireflective coating.

The adhesive films for use in the application US 2005/042,977 are selected empirically by means of a non-standard adhesion test. The films that can be used require a pull-out force of at least 0.0392 N to get separated from a polyethylene terephthalate (PET) plate that was previously coated with a fluorinated silicone layer (compound X70-201), according to a stripping process described in the Japanese standard JIS Z0237.

In practice, the adhesion test implemented in the US patent application No. 2005/042,977 appears to be insufficiently described to enable to choose the adhesive films allowing the edging. The procedure described does not make possible to suitably fix the X70-201 compound on the PET plate, so that it is impossible to carry out this test under favorable conditions.

Therefore, there is still a need for a novel edging method directed to lenses coated with an antifouling coat, which would be reliable and would allow a very high edging success rate while avoiding any slipping problem of the lens during the edging operation of interest, which is thus an object of the present invention.

After the edging, the removal of the temporary layer should enable to recover a hydrophobic and/or oleophobic external coating with properties that are substantially the same as the initial properties and in particular a water static contact angle that is substantially similar to the initial water static contact angle.

The present invention further aims at solving the problematic edging of optical articles provided with a relatively thick external anti-fouling coat, that is to say higher than or equal to 2 nm, preferably higher than 5 nm, even higher than or equal to 10 nm. Indeed, to enhance the hydrophobic and/or oleophobic coating performances, the thickness of the same should be increased up to thickness values higher than those traditionally used which are of about 2 nm. Nevertheless, increasing the thickness of the anti-fouling coating makes the glass edging even more complicated.

Typically, the traditional thickness values programmed for depositing hydrophobic and/or oleophobic coatings in vacuum deposition chambers of the Leybold 1104 type, are of about 15 nm. Coatings with improved hydrophobic properties correspond typically to programmed thickness values of from 15 to 25 nm, preferably of from 20 to 25 nm. The person skilled in the art knows that the actually obtained physical values are most of the time lower than the programmed thickness values. As used herein a "programmed thickness" is intended to mean a thickness value that has been programmed in a vacuum deposition chamber of the Leybold 1104 type, preferably a Leybold 1104.

It is a further object of the present invention to provide a lens, having hydrophobic and/or oleophobic surface properties, capable of undergoing an edging process.

These objects are aimed at according to the present invention with a treating method using a temporary adhesive composite film with improved properties.

The method for treating an optical lens of the invention, especially for rendering said optical lens capable of undergoing an edging process, comprises the following steps:
  providing an optical lens coated on at least one of the main surfaces thereof with a hydrophobic and/or oleophobic external coating;
  forming on at least part of the hydrophobic and/or oleophobic external coating of the lens, preferably the whole of it, a temporary adhesive composite film comprising a pre-formed film, one main surface of which adheres to a pressure-sensitive adhesive layer, said adhesive layer directly contacting the hydrophobic and/or oleophobic coating, the modulus of elasticity in tension E' of the preformed film being higher than or equal to 4200 MPa, and the rupture stress of the assembly composed of said temporary adhesive composite film bonded to a polycarbonate specimen coated with a fluorinated silane layer, measured under tensile stress in accordance with the shear strength measurement test according to NF EN 1465 standard, being higher than or equal to 0.05 MPa;
  recovering the optical lens comprising, in direct contact with at least said part of said hydrophobic and/or oleophobic coating, the temporary adhesive composite film which adheres through its pressure-sensitive adhesive layer to the surface of the coated lens.

As used herein, a "composite film", is intended to mean a film comprising at least two elements: a pre-formed film and a pressure-sensitive adhesive layer.

In the present application, when a lens comprises one or more film(s), layer(s) or coating(s) on the surface thereof, the expression "to deposit a film, a layer or a coating onto the lens" means that a film, a layer or a coating is to be deposited onto the uncovered surface (exposed) of the lens external coating, that is to say the coating that is the furthest from the lens substrate.

A coating which is "on" a substrate or which has been deposited "onto" a substrate is defined as being a coating which (i) is arranged above the substrate, (ii) is not necessarily in contact with the substrate, which means that one or more intermediate coating(s) may be inserted between the substrate and the coating of interest, and (iii) does not necessarily completely cover up said substrate.

In the present application, a "polymer" includes homopolymers, copolymers and oligomers. As used herein, a "(co)polymer" is intended to mean a copolymer or a polymer. A (meth)acrylate is intended to mean an acrylate or a methacrylate.

Unless otherwise stated, all the thickness values disclosed herein are physical thicknesses.

The optical lens used in the present invention comprises a substrate, preferably transparent, made of organic or mineral glass, having a convex main face and a concave main face, at least one of said main faces being provided with an anti-fouling coating (hydrophobic and/or oleophobic coating). As used herein, a "lens" also means a lens blank. This lens is preferably an ophthalmic lens for eyeglasses. The lens may be a polarized lens, a photochromic lens, or a tinted anti-sun lens.

The method according to the invention is preferably carried out on the convex face of the lens, but it can also be carried out on its concave face or on both main faces of a lens each coated with an anti-fouling coating.

Amongst the materials to be suitably used for the substrates, are to be mentioned (meth)acrylic (co)polymers, in particular methyl poly(methacrylate) (PMMA), thio(meth)acrylic (co)polymers, polyvinyl butyral (PVB), polycarbonates (PC), polyurethanes (PU), poly(thiourethanes), polyol allylcarbonate (co)polymers, ethylene/vinyl acetate thermoplastic copolymers, polyesters such as poly(ethylene terephthalate) (PET) or poly(butylene terephthalate) (PBT), polyepisulfides, polyepoxides, copolymers of polycarbonates and polyesters, cycloolefinic copolymers such as copolymers of ethylene and norbornene or ethylene and cyclopentadiene and combinations thereof.

The preferred substrates for use in the invention include those substrates obtained by the polymerization of alkyl methacrylates, in particular $C_1$-$C_4$ alkyl methacrylates such as methyl (meth)acrylate and ethyl (meth)acrylate, polyethoxylated aromatic (meth)acrylates such as the polyethoxylated bisphenolate di(meth)acrylates, allyl derivatives such as linear or branched, aliphatic or aromatic polyol allyl carbonates, thio(meth)acrylates, episulfides, as well as polythiol/polyisocyanate precursor mixtures (to produce polythiourethanes).

As used herein, a polycarbonate (PC) is intended to mean both the homopolycarbonates and the copolycarbonates and block copolycarbonates.

Particularly recommended substrates are those substrates obtained by (co)polymerizing diethylene glycol bis allyl carbonate, sold, for example, under the trade name CR-39® by the PPG Industries company (ORMA® lenses from ESSI-LOR), or by polymerizing thio(meth)acrylic monomers, such as those described in the French patent application FR 2734827, or polythiourethanes. The substrates may be obtained by polymerizing mixtures from the hereabove monomers or they may also comprise mixtures from these polymers and (co)polymers.

The lenses of the invention may comprise other surface coatings between the substrate and the anti-fouling coating, especially an impact-resistant coating, an abrasion-resistant coating and/or a scratch-resistant and/or an antireflective coating. Preferably, they comprise a hydrophobic and/or oleophobic external coating deposited onto a mono- or a multi-layered antireflective coating.

Hydrophobic and/or oleophobic coatings (i.e. the antifouling coating in the present application) are well known in the art and are typically deposited onto an antireflective coating, although they also may be deposited, for example, directly onto abrasion-resistant and/or scratch-resistant coatings.

They are defined as coatings which deionized water static contact angle is higher than or equal to 75°, preferably higher than or equal to 90°, and more preferably higher than or equal to 100°. The static contact angle may be determined by means of the liquid drop model, according to which a liquid drop having a diameter of less than 2 mm is carefully deposited onto a solid non absorbent surface and the angle at the interface between the liquid and the solid surface is measured.

Preferred hydrophobic and/or oleophobic coatings have a low surface energy, that is to say they reduce the lens surface energy to less than 20 mJ/m$^2$, preferably to less than 14 mJ/m$^2$, more preferably to less than 13 mJ/m$^2$ and even more preferably to less than 12 mJ/m$^2$. In the present application, the surface energy values are calculated according to the OWENS-WENDT method described in "Estimation of a surface force energy of polymers" OWENS D. K., WENDT R. G. (1969) J. Appl. Polym. Sci, 13, 1741-1747.

In the context of the present invention, their thickness does generally range from 1 to 25 nm, preferably from 1 to 15 nm.

The hydrophobic and/or oleophobic coatings of the invention are preferably organic in nature. As used herein, a "layer having an organic nature" is intended to mean a layer comprising a weight content that is not null, preferably that is made of at least 40%, more preferably of at least 50% of organic materials relative to the layer total weight.

Preferred hydrophobic and/or oleophobic surface coatings comprise at least one fluorinated compound, more preferably at least one silane and/or silazane type compound carrying one or more fluorinated groups, in particular fluorinated hydrocarbon groups, perfluorocarbon groups, fluorinated polyether groups, such as the $F_3C-(OC_3F_6)_{24}-O-(CF_2)_2-(CH_2)_2-O-CH_2-Si(OCH_3)_3$ or perfluoropolyether group.

A usual method to form a hydrophobic and/or oleophobic coating consists in depositing compounds carrying fluorinated groups and Si—R groups, wherein R represents a hydroxyl group or a precursor group such as a hydrolyzable group, for example $C_1$, $NH_2$, NH— or —O-alkyl, preferably an alkoxy group. They are preferably derived from fluorosilane- or fluorosilazane-type precursors, carrying preferably at least two hydrolyzable groups per molecule. Such compounds once deposited onto a surface are capable of undergoing polymerization and/or cross-linking reactions, directly or after hydrolysis.

Fluorosilanes to be particularly suitably used to form hydrophobic and/or oleophobic coatings are those containing fluoropolyether groups described in the U.S. Pat. No. 6,277,485.

Those fluorosilanes have the general formula:

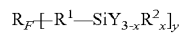

wherein $R_F$ is a monovalent or divalent polyfluoropolyether group; $R^1$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halogen atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent). Suitable compounds typically have a number average molecular weight of at least 1000. Preferably, Y is a lower alkoxy group and $R_F$ is a perfluoropolyether group.

Other recommended fluorosilanes have the formula:

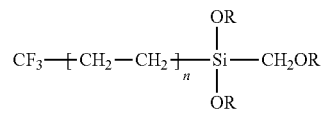

wherein n=5, 7, 9 or 11 and R is an alkyl group, preferably a $C_1$-$C_{10}$ alkyl group such as —$CH_3$, —$C_2H_5$ and —$C_3H_7$;
$CF_3(CF_2)_5CH_2CH_2Si(OC_2H_5)_3$ ((tridecafluoro-1,1,2,2-tetrahydro)octyl-triethoxysilane);

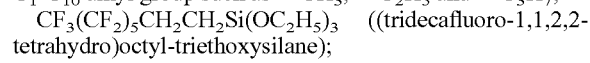

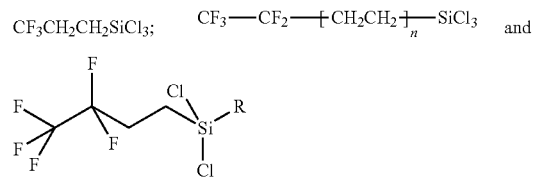

wherein n=7 or 9 and R is such as defined hereabove.

Fluorosilane-containing compositions also recommended for preparing hydrophobic and/or oleophobic coatings are described in the U.S. Pat. No. 6,183,872. They comprise organic group-containing fluoropolymers carrying silicon-based groups having the following general formula and a molecular weight of from $5.10^2$ to $10^5$:

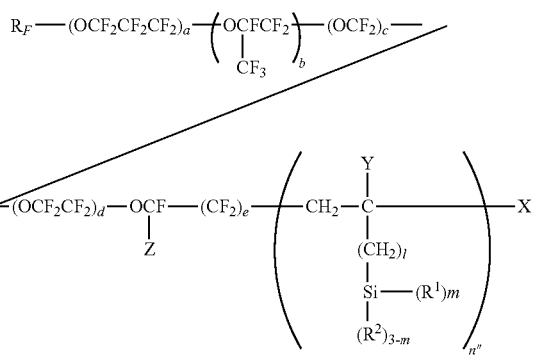

wherein $R_F$ represents a perfluoroalkyl group; Z represents a fluoro or a trifluoromethyl group; a, b, c, d and e each represent, independently from each other, 0 or an integer higher than or equal to 1, provided however that the sum of a+b+c+d+e is not less than 1 and that the order of the repeating units in brackets under a, b, c, d and e is not limited to the one illustrated; Y represents H or an alkyl group having from 1 to 4 carbon atoms; X represents a hydrogen, a bromine or an iodine atom; $R^1$ represents a hydroxyl group or a hydrolyzable group; $R^2$ represents a hydrogen atom or a monovalent hydrocarbon group, I is 0, 1 or 2; m is 1, 2 or 3; and n" is an integer being at least equal to 1, preferably at least equal to 2.

Other compounds to be suitably used for preparing fluorosilane-based anti-fouling coats are described in the patents JP 2005-187936 and EP 1300433, and have the following formula:

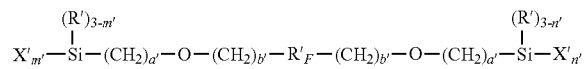

wherein $R'_F$ is a linear chain, perfluoropolyether divalent radical, R' is a $C_1$-$C_4$ alkyl radical or a phenyl radical, X' is a hydrolyzable group, a' is an integer ranging from 0 to 2, b' is an integer ranging from 1 to 5, and m' and n' are integers equal to 2 or 3.

Commercial compositions to be suitably used for preparing hydrophobic and/or oleophobic coatings are the KY130® (having the formula as given in the patent JP 2005-187936) and KP 801M® compositions marketed by the Shin-Etsu Chemical company and the OPTOOL DSX® composition (a fluorinated resin comprising perfluoropropylene groups having the formula as given in the U.S. Pat. No. 6,183,872) marketed by the Daikin Industries company. OPTOOL DSX® is the most preferred anti-fouling coating composition.

Solvents for use in the anti-fouling coating compositions are fluorinated solvents and alkanols such as methanol, preferably fluorinated solvents. Examples of fluorinated solvents are organic molecules that are in whole or part fluorinated and have a carbon chain comprising from 1 to 25 carbon atoms, such as fluorinated alkanes, preferably perfluorinated alkanes, and fluorinated ether oxides, preferably perfluoroalkyl alkyl ether oxides, and their mixtures. To be mentioned is perfluorohexane or nonafluoro-isobutyl ether.

There is a plurality of various methods for depositing anti-fouling coating compositions, amongst which the liquid phase deposition such as dip coating, spin coating (centrifugation), spray coating, or the vapor phase deposition such as vacuum evaporation. Deposition by spin or dip coating is the most preferred method.

As previously mentioned, the temporary adhesive composite film of the present invention is formed, or deposited (applied), directly onto the hydrophobic and/or oleophobic external coating.

This temporary adhesive composite film comprises at least two layers, i.e. a pre-formed film and an adhesive contact layer, which are directly contacting each other.

The pre-formed film has two main surfaces, the first one being coated with a pressure-sensitive adhesive layer that will face the lens, while the second one is typically not coated and will face the holding element of the edging device.

The pre-formed film may be composed of any material that may be removed in a later operation following an edging step, having a modulus of elasticity in tension E' higher than or equal to 4200 MPa and such that the shear strength of the assembly composed of said temporary adhesive composite film bonded to a polycarbonate specimen coated with a fluorinated silane layer, as determined in accordance with the shear strength evaluation standard NF EN 1465, is higher than or equal to 0.05 MPa.

The modulus of elasticity in tension E' of the pre-formed film is preferably higher than or equal to 4450 MPa, more preferably higher than or equal to 4500 MPa. It enables to evaluate the ability of the pre-formed film material to deform under the action of a force applied and is measured with no adhesive layer.

This modulus of elasticity (or Young's modulus, or storage modulus) is measured at 23° C. in accordance with the standard ISO 527-3 (1996). In this standard, the film elongation is measured for an increasing tensile strength applied to the film (measured in $N/mm^2$) and at a standard rate. The thus obtained stress-strain diagram, representing the stress (in $N/mm^2$) as a function of elongation (in %), shows a linear segment characterizing the elastic domain and an inflection point characterizing the end of the film elastic limit or yield point. The abscissa of this point typically lies between 12 and 15% of elongation and the ordinate varies depending on such or such film, as a function of its rigidity.

The modulus of elasticity in tension E' of the temporary adhesive composite film of the present invention (pre-formed film+PSA layer) is preferably higher than or equal to 2500 MPa.

The rupture stress of the assembly composed of the temporary adhesive composite film stuck to a polycarbonate specimen test coated with a fluorinated silane layer, as determined in tension in accordance with the shear strength evaluation standard NF EN 1465, is preferably higher than or equal to 0.08 MPa, more preferably higher than or equal to 0.1 MPa. It characterizes the adhesion performances of said adhesive composite film and depends especially on the nature of the contact adhesive involved.

Such shear strength parameter is determined in accordance with the standard NF EN 1465 called "Adhesives-Determination of tensile lap-shear strength of rigid-to-rigid bonded assemblies", adapted so as to take account of the specimens used that are made of polycarbonate and successively coated with a primer layer, an abrasion-resistant and scratch-resistant coating layer, an antireflective coating and an anti-fouling coating based on Optool™ DSX. These specimens and the shear strength test are described in detail in the experimental section.

Inserting between the hydrophobic and/or oleophobic surface lens and the holding pad an adhesive composite film with elasticity modulus characteristics (for the pre-formed film of said temporary adhesive composite film) and shear strength characteristics in accordance with the present invention makes it possible to perform the edging of the lens with no offset thereof or just a minimal one. The inventors observed that both characteristics were required to obtain a good adhesion of the holding pad. The temporary adhesive composite film of the present invention also has an outstanding adhesion to the lens hydrophobic and/or oleophobic surface.

The pre-formed film is preferably polymeric in nature. It may be composed of one or more polymer(s) preferably selected from PET (polyethylene terephthalate) or TAC (cellulose triacetate). Most preferably it is a cellulose triacetate-based film.

It may be used in the form of a polymeric foam. The pre-formed film material may also comprise reinforcement elements and come for example as a carbon- or glass-fiber reinforced resin.

The adhesive contact layer material of the temporary adhesive film of the present invention should of course be such that it does not definitively impair the surface properties of the hydrophobic and/or oleophobic coating and that after its removal, the lens optical and surface properties are on the whole similar to that of the same lens prior to depositing the temporary protective coating. The adhesive contact layer material should especially have a sufficient cohesive force so that the removal of the adhesive composite film, for example by peeling, can be effected without leaving residues on the anti-fouling coating surface.

Said adhesive layer is a pressure-sensitive adhesive layer (PSA). This layer will be conveniently called the "PSA film" or the "adhesive contact layer" in the present application and is preferably optically transparent. Its glass transition temperature Tg may preferably vary from −45° C. to 0° C.

As used herein, a "pressure-sensitive adhesive" or a "contact adhesive" is intended to mean an adhesive which is able to adhere to a surface by simply exerting a pressure with no need to use any additional external source of energy such as temperature, irradiation or solvent. However, other external sources of energy may be used for improving adhesion. These adhesives are permanently tacky in a dry form (with no solvent), at room temperature or at their working temperature. Their adhesion mechanism does not involve any covalent bond formation with the surface with which they are brought into contact, but on the contrary generates reversible electrostatic interactions of the Van der Waals type.

Contact adhesives do typically exist in three forms: as an aqueous composition (latex), in an organic solvent-based composition or in a thermosetting form (obtained by a method of the "hot melt" type).

PSA families are categorized depending on the nature of the main elastomer used in the adhesive formula. Without being limited thereto, the main families for use in the present invention include natural rubber-based PSA (polyisoprene), poly(meth)acrylate-based PSA (such as ethylhexyl polyacrylate, n-butyl polyacrylate), styrene copolymer-based or styrene block copolymer-based PSA (such as styrene-isoprene (SI) block copolymers, styrene-isoprene-styrene (SIS) block copolymers, styrene-butadiene (SB) block copolymers, styrene-butadiene-styrene (SBS) block copolymers), and combinations thereof.

Styrene-butadiene statistical copolymers, synthetic rubber such as butyl-rubber or synthetic polyisoprenes, vinyl polyacetates, polyisobutylenes, polypropylenes, polybutadienes, acrylonitrile-based polymers, silicone polymers (for example of the silane or siloxane type), polyurethanes, vinyl and ethyl polyethers, polyvinyl pyrrolidones, and combinations thereof, may also be used as major components in PSA formulations. Other PSA examples are mentioned in Sobieski and al., *Handbook of Pressure-Sensitive Adhesive Technology*, 2nd ed., pp. 508-517 (D. Satas, ed.), Van Nostrand Reinhold, N.Y. (1989), included as a reference. PSA used in the present invention are preferably selected from polyacrylate-based, polyurethane-based and/or styrene block copolymer-based PSAs.

In a first alternative embodiment of the invention, the temporary adhesive composite film is applied onto at least one part of the optical lens hydrophobic and/or oleophobic external coating, a main surface of the temporary adhesive composite film pre-formed film having been coated with said pressure-sensitive adhesive layer prior to applying said temporary adhesive composite film onto the optical lens. The pre-formed film then acts as a support film. In other words, the assembly composed of the pre-formed film+the pressure-sensitive adhesive layer was prepared in a step preceding its application onto the hydrophobic and/or oleophobic external coating.

In a first embodiment, the PSA adhesive layer is formed by depositing onto the main surface of the support film a liquid adhesive composition followed with a curing step or a drying step of the liquid composition (typically performed at a temperature ranging from 40° C. to 130° C.) until obtaining a state in which said composition is no more able to flow and forms a homogeneously thick layer. Such adhesive composition may be deposited by means of any usual appropriate liquid method such as dip coating, spin coating, spraying or brush coating, preferably by dip coating or spin coating.

Said adhesive composition may of course further comprise additives so as to modify the tack (adhesion promoting agents) or the rheological (viscosity, thixotropy) characteristics thereof. As is well known, a polymer or a mixture of polymers that is or are as such devoid of contact adhesive properties may also acquire these properties through the addition of the previously mentioned additives.

In a second embodiment, the adhesive layer is applied onto the support film through bonding a pre-formed film, which for example comes as a sandwich between two liners (laminated protective tapes). Such liner/PSA film/liner stacks are commercially available, for example in the form of a 25 µm-thick PSA film which both adhesive faces are each protected with a 50 µm-thick polyester liner. They are preferably applied onto the support film by lamination.

It is also possible to directly use a support film/PSA film/liner stack.

The adhesive contact layer of the temporary adhesive composite film has preferably a thickness ranging from 1 to 100 µm, preferably from 2 to 50 µm, more preferably from 5 to 40 µm. The support film has preferably a thickness ranging from 10 to 250 µm, more preferably from 20 to 200 µm. Typically, the support film thickness:adhesive contact layer thickness ratio does preferably range from 1:1 to 10:1, preferably from 2:1 to 8:1. The whole thickness of the temporary adhesive composite film of the invention does preferably range from 1 to 250 µm, more preferably from 10 to 200 µm.

While the temporary adhesive composite film of the invention in its simplest form is a bilayered film, it may also comprise one or more additional layers deposited onto its second main surface, that is to say its face that is not coated with the PSA film. Although it is not the most preferred embodiment of the invention, the adhesive composite film of the invention can be made especially adhesive on both faces by depositing an adhesive layer onto its second main surface.

The temporary adhesive composite film of the invention is applied through laminating by pressing the adhesive contact layer thereof against the lens hydrophobic and/or oleophobic coating surface, so that said adhesive layer be directly in contact with said hydrophobic and/or oleophobic coating.

It may be applied onto the surface of the lens by a simple manual pressure. However, due to the high modulus of elasticity of the support film, the adhesive composite film of the invention is relatively rigid. When this temporary adhesive composite film is intended to cover a substantial part of the lens surface, especially the whole lens surface, it is particularly recommended to use for its deposition the specific technique and equipment described in the application WO 2006105999, in particular in Examples 3 and 4 thereof.

This method for applying a flat film onto an optical lens may be used whatever the curvature of the lens intended to be covered with the temporary film of the invention. It involves a thermal assistance allowing for hot deforming the film by means of an ovoid pressing die. The adhesive film is typically pre-heated at a temperature ranging from about 80 to 180° C. so as to undergo its thermoforming, prior to being applied against the anti-fouling coat of the lens.

It is also possible to transfer the adhesive composite film of the present invention from a temporary support to the surface of the lens. In this alternative, the adhesive composite film of the invention is stuck (through its non adhesive face, that is to say the face of the support film that is not coated with the adhesive contact layer) to a high-dimensional adhesive support, for example a support covered with an adhesive layer. The assembly temporary support+adhesive composite film of the invention is then bonded to the surface of the lens, for example according to the method described in Examples 3 and 4 of the patent application WO 2006/105999. At the end of this application step, the adhesive face of the temporary support may be in contact with part of the anti-fouling coating of the lens, if the adhesive composite film of the invention does not cover the whole surface of the lens. Lastly, the temporary support is removed. Of course, implementing this alternative embodiment implies that the adhesive composite film of the invention adheres more strongly to the surface of the lens than the temporary support adheres to the surface of the adhesive composite film or to the anti-fouling coating. A temporary support should thus be selected covered with an adhesive layer with a low affinity to the external surface of the adhesive film and to the anti-fouling coating.

According to a second alternative of the invention, the formation on at least one part of the optical lens hydrophobic and/or oleophobic external coating comprises successively applying the adhesive layer (PSA), and thereafter the pre-formed film.

In a first step, the adhesive layer is transferred from a transfer support onto the hydrophobic and/or oleophobic layer. The transfer support is removed, the adhesive layer adhering more strongly to the surface of the lens than to the surface of the transfer layer. In a second step, the pre-formed film is applied or transferred, from a transfer support, to the surface of the adhesive layer.

In the two previous alternatives, a soft support will be preferably used as a transfer support, with a thickness typically ranging from 10 to 200 microns or a flexible support, with a thickness typically ranging from 0.2 to 5 mm, more preferably from 0.5 to 2 mm, preferably made of plastic.

Examples of thermoplastic (co)polymers to be suitably used for making this support include polysulfones, aliphatic poly(meth)acrylates, such as methyl poly(meth)acrylate, polyethylene, polypropylene, polystyrene, SBM block copolymers (styrene-butadiene-methyl methacrylate), polyphenylene sulfide (PPS), arylene polyoxides, polyimides, polyesters, polycarbonates such as bisphenol A polycarbonate, polyvinyl chloride, polyamides such as nylons, their copolymers and combinations thereof. Polycarbonate is the most preferred thermoplastic material.

The temporary support may be used having been previously coated with a layer of a mold release agent intended to facilitate the transfer. This layer may be optionally removed at the end of the transfer step.

The temporary adhesive composite film is formed so as to cover at least partially the hydrophobic and/or oleophobic external coating of the lens.

The deposition may be performed on the whole surface of the lens face which is intended to receive the adhesive system holding pad-chuck, or on part thereof. In particular, the temporary adhesive composite film could be applied solely onto the area intended to be contacted with the holding pad of the lens, for example the central area of the lens.

The adhesive composite film may uniformly cover the target surface, that is to say have a continuous structure, but it may also have a discontinue structure, for example being in the form of a screen. The film may indeed be for example "punctured" so as to avoid removing erasable marks that would be present on the surface of the lens, especially on progressive multifocal lenses. The shape of the adhesive film is not limited and this can be, without limitation, of circular, elliptical, rectangular or oblong form.

The area covered with the temporary adhesive composite film is such that the contact area between the composite film and the holding pad is sufficient for ensuring the adhesion of the lens to the pad. Generally, the temporary composite film covers at least 15%, preferably at least 20%, more preferably at least 30%, even more preferably at least 40%, and most preferably the whole of the surface of the lens face onto which the pad adheres, that is to say typically the convex face of the lens.

Moreover, the adhesive composite film of the invention is advantageously an optically transparent film. It does mean herein that an optical lens coated on one of the main faces thereof with an anti-fouling coat and with a temporary adhesive composite film according to the present invention has a light transmission factor in the visible spectrum $\tau_v$, also called relative light transmission factor in the visible spectrum, higher than 75%, more preferably higher than 80% (measured in accordance with the standard ISO 8980-3 and defined in accordance with the standard ISO 13666:1998 within the wavelength range of from 380 to 780 nm). It thus remains possible to perform traditional power measurements onto the lens coated with the temporary adhesive composite film by means of a frontofocometer.

The pre-formed film enables to increase the surface energy of the lens with hydrophobic and/or oleophobic properties. Preferably, the pre-formed film increases the surface energy of the lens up to at least 15 mJ/m$^2$, preferably up to at least 25 mJ/m$^2$. Typically the surface energy of the pre-formed film ranges from 15 to 70 mJ/m$^2$, preferably from 25 to 70 mJ/m$^2$.

Once the temporary adhesive composite film has been deposited onto the lens, the latter becomes capable of undergoing an edging process.

The method for treating an optical lens according to the present invention may further comprise a subsequent step of blocking the lens provided with the temporary adhesive composite film and directly contacting the hydrophobic and/or oleophobic coating, that is to say a step for arranging said lens in an edging device comprising a holding system fitted with a holding means adhering to the external surface of the temporary adhesive composite film (that is to say typically the second main surface of the pre-formed film, as defined in the present invention), an edging step of the blocked lens, and a deblocking step consisting in removing the holding element from the lens surface. These additional steps are traditional and known from the person skilled in the art (cf. for example EP 1 392 613 and US 2005/042,977), and therefore they will not be described in detail. The treating method of the present invention is in this case an optical lens edging method.

The holding system comprises typically a holding element (chuck) and a holding pad (commonly referred to as "pad"). The preferred holding pads are self-adhesive stickers (caps provided with pressure adhesive), more preferably stickers that are self-adhesive on both faces, for example stickers of the 3M Leap™ II PAD type or more sophisticated stickers like those provided by the Vigteqnos company, described especially in the international patent applications WO 2006/082635, WO 2006/003700 and WO 2006/003699.

The holding element may directly adhere to the external surface of the temporary adhesive composite film, that is to say without requiring any further holding pad, for example if the adhesive composite film of the invention is provided on its second main surface with an adhesive layer, or it may adhere directly to the external surface of the temporary adhesive composite film, for example through a holding pad, which represents the preferred embodiment.

After edging, the glass will have the required dimensions to be suitably inserted into the corresponding eyeglass frame. More precisely, the edging method according to the present invention provides glasses with a maximum 2° offset, and, most preferably an offset that is lower than or equal to 1°

In a subsequent step, the temporary adhesive composite film may be removed, especially by being stripped out (removal by application of a force) of the edged lens, so as to restore the hydrophobic and/or oleophobic surface properties thereof.

At the end of the step of removal of the temporary adhesive composite film, a final edged optical lens is recovered, which has optical and surface characteristics of the same order or substantially similar to that of the initial lens, especially as regards the hydrophobic and/or oleophobic surface properties thereof.

Of course, this embodiment encompasses the event of an optical lens that is already coated with the temporary adhesive composite film of the invention arranged in an edging device.

Adhesive composite films according to the invention may be used to restore the edging ability of lenses coated with any external coating having hydrophobic and/or oleophobic properties, but they are especially interesting for edging optical articles comprising a hydrophobic and/or oleophobic coating with a thickness higher than or equal to 2 nm, preferably higher than or equal to 5 nm, more preferably higher than or equal to 10 nm. The preferred thickness range is 2 to 10 nm.

Advantageously, the method according to the invention significantly improves the edging success rate for lenses coated with a hydrophobic and/or oleophobic coating, in particular obtained from the compounds described in the U.S. Pat. No. 6,183,872 thanks to an adhesive composite film enhancing adhesion during edging. The success rate of an edging method according to the present invention is of about 100%, and enables thus to avoid the hazards originating from the quality of the edged glasses.

The present invention further relates to an optical lens capable of undergoing an edging process, that may be obtained using the method of the invention, comprising on at least one of the main surfaces thereof a hydrophobic and/or oleophobic external coating, and, deposited directly onto said hydrophobic and/or oleophobic external coating, a temporary adhesive composite film such as described hereabove, said composite film thus adhering to the surface of the coated lens.

The present invention lastly relates to the use of a temporary adhesive composite film such as described hereabove for holding in an edging device an optical lens comprising on at least one of the main surfaces thereof a hydrophobic and/or oleophobic external coating.

The present invention is illustrated, in a non limitative way, by means of the following examples.

EXPERIMENTAL SECTION

1. General Procedures and Material

The optical articles used in the examples comprise an ORMA° lens substrate from ESSILOR of 65 mm of diameter, having a power of −2.00 diopters and a thickness of 1.2 mm, coated with an impact-resistant primer coating (thickness 1 micrometer) based on a polyurethane latex containing polyester units, cured at 90° C. for one hour (Witcobond® 234 from BAXENDEN CHEMICALS modified through dilution to reduce its viscosity, spin coating at 1500 rpm for 10 to 15 seconds) then with an abrasion-resistant and scratch-resistant coating (hard coat) (thickness of around 3 micrometers) disclosed in Example 3 of the European patent EP 0614957 (refractive index of 1.50), based on a hydrolyzate composed of GLYMO+DMDES+colloidal silica and aluminium acetylacetonate, with an antireflective coating and last with an anti-fouling coating.

More precisely, said abrasion-resistant and scratch-resistant coating was obtained by depositing and curing a composition comprising by weight, 224 parts of GLYMO, 80.5 parts of HCl 0.1 N, 120 parts of DMDES, 718 parts of a 30% by weight colloidal silica in methanol, 15 parts of aluminium acetylacetonate and 44 parts of ethylcellosolve. The composition further comprises 0.1% by weight of a surfactant FLUORAD™ FC-430® from 3M relative to the composition total weight.

On this abrasion-resistant and scratch-resistant coating is deposited an antireflective coating tetralayer $ZrO_2$ (27 nm)/$SiO_2$ (21 nm)/$ZrO_2$ (80 nm)/$SiO_2$ (81 nm) (the thickness values correspond to physical thicknesses)(deposited by evaporation under vacuum) and last an Optool™ DSX-based anti-fouling coat (programmed thickness 14 nm, deposition under vacuum, compound marketed by the Daikin Industries company).

The deposition assembly is a Leybold 1104 machine fitted with an electron gun ESV14 (8 kV) for evaporating the oxides and with a Joule effect crucible for depositing the top coat.

2. Characterization Tests a) The elasticity modules were measured at 23° C. and at ambient humidity by means of an apparatus QT50 LP from MTS used in tensile mode in accordance with the standard ISO 527-3 (1996) (force sensor 1 kN and shift class 0.5; optical extensometer ME046), on standard specimens (type 2) of films (support film or adhesive film) with a width and a length respectively of 12.7 mm and 180 mm and with a section lower than or equal to 1 mm. The distance between register marks is of 50 mm+/−0.5 mm. The initial distance between the jaws is of 100 mm+/−5 mm. The tension rate is of 5 mm/min.

b) The peeling tests at 180° were carried out in accordance with the standard ISO 8510-2 dated December 2006, but at a rate of 300 mm/min. The test apparatus is the QT50 LP machine from MTS. Force sensor 100 N and shift class 0.5. The measurements were conducted at 23° C. and at ambient humidity. The specimens and the adhesive film are dimensioned so that the overlapping width is of 25 mm and the overlapping length is of 150 mm. Implementation parameters: standard roller for roller-pressing weight 2217 g. Number of roller-pressing runs: 10.

The specimens are coated with the stack described under c) hereunder. They therefore comprise an Optool™ DSX-based anti-fouling coating having a programmed thickness of 14 nm (unless a 25 nm programmed thickness is specified).

c) Determining the shear strength of a temporary adhesive composite film

This shear strength parameter was determined in tension at 23° C., at ambient humidity in accordance with the standard NF EN 1465, adapted in that polycarbonate specimens are used, that are successively covered with a polyurethane latex primer layer containing polyester units (Witcobond® 234 from the BAXENDEN CHEMICALS company, spin coating at 1500 rpm for 10 to 15 seconds, cured at 90° C. for one hour), with an abrasion-resistant and scratch-resistant coating layer (hard coat) disclosed in Example 3 of the European patent EP 0614957 (obtained as described in §1), with the antireflective coating tetralayer $ZrO_2/SiO_2/ZrO_2/SiO_2$ (deposited by evaporation under vacuum and described in §1) and lastly with an Optool™ DSX-based anti-fouling coat with a programmed thickness of 14 nm (deposition under vacuum, compound marketed by the Daikin Industries company).

Said abrasion-resistant and scratch-resistant coating was obtained as described in §1.

The test sequence of operations is as follows. A 25 mm×150 mm tape of adhesive film (comprising a support film coated with an adhesive contact layer) is deposited with the adhesive side facing the specimen's face provided with the anti-fouling coat, leaving a tape portion extending out of the specimen.

Overlapping width 25 mm; overlapping length 25 mm. Implementation parameters: standard roller for roller-pressing weight 2217 g, number of roller-pressing operations: 10. An axial force (through the specimen axis) is exerted until it comes to an adhesive loss between the film and the specimen. The tension rate is of 5 mm/min. The rupture stress expressed in megapascals is measured.

The test is carried out on pressure-sensitive adhesive films having an adhesive layer thickness ranging from 50 to 150 microns, preferably of 80 microns, which will be considered as the test thickness value. Very similar results are obtained whatever the thickness used in the previously mentioned thickness range, for adhesives having rheological properties of the same order.

d) Protocol for Measuring the Offset of Lenses Undergoing Trimming Operations i) Description of the Test The edging test is carried out on an Essilor Kappa grinder. Lenses are edged so that they are given the shape of a specific eyeglass frame template (see hereunder). The following equipment is required for conducting the test:

Essilor CLE 60 Frontofocometer (for glass pointing and final inspection)
Essilor Kappa digital equipment (tracer-blocker-grinder)
Frame template of the Charmant type reference 8320, model 05, size 51.
Pseudo frame for control
Sticker or adhesive holding pad LEAP II, 24 mm diameter, GAM200 from the 3M company
Essilor clutch for blocking the sticker.

ii) Sampling and Mounting Parameters

The retained mounting dimensions are as follows:
Height: Half-height boxing i.e.
PD (right and left)=32 mm and axis=90°

The trimming cycle used is a cycle adapted to the material (plastic cycle for low refractive index, polycarbonate cycle for PC and cycle for substrates having a mean refractive index MHI). The retained clamping pressure is the brittle glass pressure option of the grinder.

iii) Controls

After edging, controls are performed so as to determine whether the edging operation succeeded. Controls are performed using the frontofocometer CLE 60 by pointing the lenses held in the pseudo-frame. Axes are registered during this phase.

If the lens, after the edging operation cannot be inserted into the pseudo-frame or if the lens can be inserted into the pseudo-frame, but with an offset of more than 2°, the lens is non-compliant and does not pass the test successfully. (the result is noted "−" in Table 2). If the glass offset is lower than 2°, the lens passes the test (the result is noted "+" in Table 2).

The results given in Table 2 result from an average of 20 lenses.

e) Drilling Test Protocol

After the edging operation, the lens and clamping device/adhesive pad assembly, with the clamping device/adhesive pad firmly adhering to the lens is placed in an Optidrill or Minima2 drilling machine and held in position by a blocking device. The lens is then drilled:

either manually with the Minima 2 drilling machine provided with a drill of 2.2 mm diameter, rotating at 3500 rpm,
or automatically with the Optidrill Evo drilling machine provided with a drill of 2.2 mm diameter, rotating at 12000 rpm.

After drilling, the blocking system is unlocked and the drilled lens is recovered together with the clamping device/adhesive pad assembly, then the chuck is removed and the drilled lens is recovered.

When the lens can be positioned in the drilling device, it is considered as having passed the drilling test successfully (result noted "+" in Table 2. If not, the result is noted ("−").

3. General Procedure for Applying a Temporary Adhesive Composite Film

The bilayered adhesive films in accordance with the present invention were prepared by applying onto a PET or TAC support film a pre-formed adhesive film. One of the two protective liners of a 25 μm-thick pre-formed adhesive film is removed and the adhesive surface of the film is positioned so as to face one of the support film both faces. Thereafter these two films are bonded together by being laminated between a pair of rollers, while controlling an applied pressure of 4-5 bars.

After this step of bonding the adhesive contact layer to the support film, the resulting flat adhesive film is cut to the dimensions of the conformation device described in the application WO 2006/105999 (minimum: 10 cm×10 cm). Thereafter the second protective liner is removed and the adhesive film is set in place in the conformation device. The optical lens comprising on its convex face an anti-fouling coating is set in place in the fixture by orienting its convex face to the adhesive face of the adhesive film.

The flat film is then laterally heated at a temperature of 100° C. and the pressing die (pad for pad printing in silicon Base 4.00) is then pressed against the non adhesive surface of the adhesive film (surface devoid of any support film) so as to suitably deform the same. The pad is then lowered so as to press the adhesive surface of the film against the coated lens surface (Applied force: 20 kg). The pad is removed, thus enabling to recover an optical lens provided with an anti-fouling coating coated with the temporary adhesive composite film adhering to the surface of the lens. If the temporary adhesive composite film width is higher than the lens, it may be cut to the dimensions of said lens after the pressing step.

4. Descriptions of the Adhesive Films Used in the Examples

The support film of the invention used in Example 1 is a cellulose triacetate (TAC) film provided by the Tsutsunaka company, with a modulus of elasticity in tension of 4600 MPa at 23° C. (rupture stress: 115 MPa, nominal strain at rupture: 27%, stress at the yield point: 91 MPa, deformation at the yield point (elastic limit): 4.5%).

The adhesive composite film according to the present invention (Example 1) comprises the TAC support film as mentioned hereabove and as an adhesive contact layer an acrylic type adhesive with a glass transition temperature of −26° C. provided by the Nitto Denko company and marketed under reference CS9621.

The temporary adhesive composite film of Comparative example C1 is an adhesive film SWT10 provided by the Nitto Denko company. The temporary adhesive composite film of Comparative example C2 is an adhesive film MPF NT-8 provided by the Mitsui company. The temporary adhesive composite film of Comparative example C3 differs from that of Example 1 in that the adhesive contact layer was replaced by the HJ9150 adhesive. The temporary adhesive composite film of Comparative example C4 differs from that of Example 1 in that the adhesive contact layer was replaced with an adhesive marketed under reference 8141 by the 3M company.

The support films of Comparative examples C1 and C2 have a modulus of elasticity in tension lower than 4200 MPa (value not communicated). The adhesive films of comparative examples C3 and C4 have a shear strength lower than 0.05 MPa under the test conditions used in the present application, and a modulus of elasticity in tension higher than 4200 MPa, which is higher than that of the support film alone.

The characteristics of the different adhesive films used are given in Table 1.

TABLE 1

|  | Support film material | Support film thickness | Contact adhesive type | Contact adhesive layer thickness |
|---|---|---|---|---|
| Example 1 | TAC | 80 µm | Polyacrylic | 25 µm |
| Example C1 | PVC | 70 µm | Polyacrylic | 10 µm |
| Example C2 | Polyethylene | 95 µm | Polyolefin | 25 µm |
| Example C3 | TAC | 80 µm | Polyacrylic | 50 µm |
| Example C4 | TAC | 80 µm | Polyacrylic | 25 µm |

5. Results

Table 2 presents the results in the various tests of the adhesive films and the lenses coated therewith.

TABLE 2

|  | Example 1 | Example C1 | Example C2 | Example C3 | Example C4 |
|---|---|---|---|---|---|
| Modulus of elasticity in tension of the adhesive film (MPa) | 3000 | 280 | 102 | 5500 | 6700 |
| Rupture stress (MPa) | 66 | 14.8 | 11 | 57 | 80 |
| Nominal strain at rupture (%) | 18 | 176 | 380 | 14 | 23 |
| Rupture stress (Shear strength test) (MPa) | 0.13** | 0.077** | 0.057** | 0.032** | 0.031** |
| Peeling at 180° Linear tear strength (N/cm) | 0.08** (0.072)*** | 0.06** (0.08)*** | 0.012** (0.011)*** | 0.055** | 0.039** |
| Edging test/Drilling test(**) | +/+ | −/− | −/− | −/− | −/− |
| Edging test/Drilling test(***) | +/+ | −/− | −/− | −/− | −/− |

*Test described in § 2.c).
**Tests carried out on an anti-fouling coating with a programmed thickness of 14 nm.
***Tests carried out on an anti-fouling coat with a programmed thickness of 25 nm.

Only lenses provided with an adhesive film according to the present invention achieved good results in edging and drilling tests (Example 1). Lenses of Examples C1 to C4 all did produce an offset of more than 2°. It can therefore be observed that the present invention produced its beneficial result even if the hydrophobic and/or oleophobic layer thickness is higher (programmed thickness of 25 nm).

Comparative examples C1 and C2 demonstrate the crucial role of the modulus of elasticity in tension which an adhesive film according to the invention should have.

Comparative examples C3 and C4 demonstrate the crucial role of the shear strength which an adhesive film according to the invention should have, which especially depends on the contact adhesive type. Despite a correct rigidity, the adhesive films of Examples C3 and C4 result in poor performances upon edging.

Peeling tests at 180° do reveal, by comparing Examples 1 and C1 for a 10 nm-thick anti-fouling coat, that the adhesive film performances during this test are not necessarily correlated with a proper edging ability.

It should be noted that the method according to the invention may also be carried out with a polyethylene terephthalate (PET) support film marketed by the DuPont Teijin Films company under reference Melinex® 506 rather than with a TAC support film, all parameters being otherwise unchanged. The corresponding temporary adhesive composite film, provided with the same adhesive contact layer or with a PSA AR Clear 8796 glue from the Adhesives Research company, obtained similar results in the edging tests (data not given here). The adhesive film of Example 1 is however the most preferred film of the present invention because cellulose triacetate can be more readily cut in machines than PET.

In addition, it could be observed that after a one week-storage in contact with the temporary adhesive composite film of the invention, the anti-fouling coating did not show any performance alteration.

The invention claimed is:

1. A method for treating an optical lens, comprising:
providing an optical lens coated on at least one main surface thereof with a hydrophobic external coating, an oleophobic external coating, or a hydrophobic and oleophobic external coating;
forming on at least part of the hydrophobic external coating, the oleophobic external coating, or the hydrophobic and oleophobic external coating of the optical lens a temporary adhesive composite film, comprising a pre-formed film, one main surface of which adheres to a pressure-sensitive adhesive layer, the adhesive layer directly contacting the hydrophobic coating, the oleophobic coating, or the hydrophobic and oleophobic coating;
recovering the optical lens comprising, in direct contact with at least part of the hydrophobic coating, the oleophobic coating, or the hydrophobic and oleophobic coating, the temporary adhesive composite film adhering through the pressure-sensitive adhesive layer to the coated lens surface;
wherein the pre-formed film has a modulus of elasticity in tension E' that is higher than or equal to 4450 MPa and a rupture stress of the temporary adhesive composite film bonded to a polycarbonate specimen coated with a fluorinated silane layer, measured under tensile stress in accordance with shear strength evaluation standard NF EN 1465, is higher than or equal to 0.05 MPa.

2. The method of claim 1, wherein the temporary adhesive composite film is applied onto at least one part of the hydrophobic external coating, the oleophobic external coating, or the hydrophobic and oleophobic external coating of the optical lens, and the pre-formed film of the temporary adhesive composite film is further defined as a support film having a main surface coated with the pressure-sensitive adhesive layer prior to applying the temporary adhesive composite film.

3. The method of claim 1, wherein the pre-formed film modulus of elasticity in tension E' is higher than or equal to 4500 MPa.

4. The method of claim 1, wherein the rupture stress of the adhesive composite film bonded to a polycarbonate specimen coated with a fluorinated silane layer, measured under tensile stress in accordance with the shear strength evaluation standard NF EN 1465, is higher than or equal to 0.08 MPa.

5. The method of claim 4, wherein the rupture stress is higher than or equal to 0.1 MPa.

6. The method of claim 1, wherein the pre-formed film is a polyethylene terephthalate-based film or a cellulose triacetate-based film.

7. The method of claim 1, wherein the adhesive composite film has a thickness ranging from 1 to 250 μm.

8. The method of claim 7, wherein the adhesive composite film has a thickness ranging from 10 to 200 μm.

9. The method of claim 1, wherein the hydrophobic coating, the oleophobic coating, or the hydrophobic and oleophobic coating has a thickness higher than or equal to 2 nm.

10. The method of claim 9, wherein the hydrophobic coating, the oleophobic coating, or the hydrophobic and oleophobic coating has a thickness higher than or equal to 5 nm.

11. The method of claim 10, wherein the hydrophobic coating, the oleophobic coating, or the hydrophobic and oleophobic coating has a thickness higher than or equal to 10 nm.

12. The method of a claim 1, wherein the hydrophobic coating, the oleophobic coating, or the hydrophobic and oleophobic coating comprises fluorosilane, fluorosilazane type materials, or fluorosilane and fluorosilazane type materials.

13. The method of claim 1, wherein the temporary adhesive composite film is a coating that can be removed by stripping.

14. The method of claim 1, further comprising:
placing the optical lens in an edging device comprising a holding system comprising a holding element so that the holding element adheres to the external surface of the temporary adhesive composite film;
edging the lens;
discharging the lens out of the edging device; and
removing the adhesive composite film so as to recover an edged final optical lens.

15. The method of claim 1, wherein the temporary adhesive composite film is formed on the whole of the hydrophobic external coating, the oleophobic external coating, or the hydrophobic and oleophobic external coating of the optical lens.

16. The method of claim 1, wherein the temporary adhesive composite film is pre-heated so as to undergo thermoforming before being formed on at least part of the hydrophobic external coating, the oleophobic external coating, or the hydrophobic and oleophobic external coating of the optical lens.

17. An optical lens capable of being successfully edged, wherein the optical lens is coated on at least one main surface thereof with a hydrophobic external coating, an oleophobic external coating, or a hydrophobic and oleophobic external coating, and at least part of said hydrophobic external coating, oleophobic external coating, or hydrophobic and oleophobic external coating is coated with a temporary adhesive composite film comprising a pre-formed film, one main surface of which adheres to a pressure-sensitive adhesive layer, the adhesive layer directly contacting and adhering to said at least part of the hydrophobic coating, the oleophobic coating, or the hydrophobic and oleophobic coating, and wherein the pre-formed film has a modulus of elasticity in tension E' that is higher than or equal to 4450 MPa and a rupture stress of the temporary adhesive composite film bonded to a polycarbonate specimen coated with a fluorinated silane layer, measured under tensile stress in accordance with shear strength evaluation standard NF EN 1465, is higher than or equal to 0.05 MPa.

* * * * *